(12) United States Patent  
Ahmad et al.

(10) Patent No.: US 9,104,421 B2
(45) Date of Patent: Aug. 11, 2015

(54) TRAINING, POWER-GATING, AND DYNAMIC FREQUENCY CHANGING OF A MEMORY CONTROLLER

(75) Inventors: Sagheer Ahmad, Cupertino, CA (US); Edward L. Riegelsberger, Fremont, CA (US); Tony Yuhsiang Cheng, Union City, CA (US); Laurent Rene Moll, San Jose, CA (US); Brian Keith Langendorf, Benicia, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 341 days.

(21) Appl. No.: 13/561,884

(22) Filed: Jul. 30, 2012

(65) Prior Publication Data
US 2014/0032947 A1    Jan. 30, 2014

(51) Int. Cl.
*G06F 1/32* (2006.01)
*G06F 9/44* (2006.01)

(52) U.S. Cl.
CPC ............ *G06F 1/3275* (2013.01); *G06F 9/4418* (2013.01); *Y02B 60/1228* (2013.01)

(58) Field of Classification Search
CPC ... G06F 1/324; G06F 13/1668; G06F 1/3253; G06F 1/3275
USPC ........................................................ 713/323
See application file for complete search history.

(56) References Cited

U.S. PATENT DOCUMENTS

| | | | |
|---|---|---|---|
| 7,627,730 B1 * | 12/2009 | Moll | 711/170 |
| 8,055,871 B1 | 11/2011 | Schulze et al. | |
| 8,656,198 B2 * | 2/2014 | Branover et al. | 713/323 |
| 2010/0250972 A1 * | 9/2010 | Freitas | 713/300 |
| 2011/0320839 A1 | 12/2011 | David et al. | |

FOREIGN PATENT DOCUMENTS

| DE | 102011102238 A1 | 12/2011 |
|---|---|---|
| GB | 2481492 A | 12/2011 |

* cited by examiner

*Primary Examiner* — Albert Wang (57) ABSTRACT

A method for managing a memory controller comprising selecting a low-power state from a plurality of low-power states. The method further comprises transitioning to the low-power and entering the low-power state when the transition is complete, provided a wake-event has not been received. An apparatus comprises a controller configured to select a power state for transition, a state-machine configured to execute steps for transitions between power states of a memory controller connected by a bus to a memory, a storage configured to store at least one context, and a context engine configured to stream, at the direction of the state-machine engine, the at least one context to the memory controller. Streaming comprises communicating N portions of context data as a stream to N registers in the memory controller. A context comprises a plurality of calibrations corresponding to a state selected for transition.

22 Claims, 6 Drawing Sheets

TRAINING, POWER-GATING, AND DYNAMIC FREQUENCY CHANGING OF A MEMORY CONTROLLER

TECHNICAL FIELD

The present disclosure relates generally to the field of memory and memory controllers and more specifically to the field of dynamic power-gating and frequency changing of a memory controller.

BACKGROUND

Computer systems continue to evolve, with ever faster processing speeds, greater data handling capabilities, and increasing storage capacity. Computers have also been steadily reduced in size. This size reduction is most apparent in the laptop, notebook, tablet, and hand-held computer markets. While desiring to continuously decrease the size and weight of laptops, notebooks, and hand-held computers, manufacturers have also steadily reduced the size and weight of on-board batteries. Because battery-life in laptops, notebooks, and hand-held computers is such an important consideration, power management methods are utilized to increase battery-life.

Conventional computer systems may employ a multitude of power saving features for reducing system power, such as power conservation methods for graphical user interfaces, processors, and memory controllers, which for example, may include frequency reduction, clock-gating, power-gating, low-power DRAM states, low-power I/O modes, and disabling of analog circuits, such as phase-locked loops (PLLs) and delay-locked loops (DLLs). A coordinated engagement and disengagement of these low-power features can enable low-power system states to be utilized for power savings.

However, any level of power-gating and frequency reduction of a system component (e.g., microprocessors and memory controllers) is time constrained based on power mode entry and exit delays. In other words, while deep power savings may be achieved through power-gating and/or frequency reductions, such power-gating and frequency reductions may not be permitted if either the power-gating or the frequency reduction entry and exit times exceed timing constraints. When memory controller states are changed, the memory controller state may be saved, memory controller is powered off and later, memory controller is powered on and its state is restored and this resulting latency must be transparent to any agent requesting memory access. In other words, the deepest power-gating and power saving states may be unreachable because the resulting timing latency is too great.

SUMMARY OF THE INVENTION

Embodiments of the present invention provide a solution to the challenges inherent in managing computer system power conservation states with their required entry and exit latencies. In a method according to one embodiment of the present invention, a method for efficient state transitions is disclosed. Efficient state transitions may be achieved using a centralized sequencing mechanism that is aware of real-time system latency tolerances, can control multiple mechanisms distributed throughout a chip, and is accompanied by local storage of pre-computed and calibrated power-state "contexts" applicable to each selectable power state (low-power states and active states).

In a method according to one embodiment of the present disclosure, a method for managing a memory controller is disclosed. The method comprises selecting for entry a first low-power state from a plurality of available low-power states, transitioning to the first low-power state from an original state, and provided a wake event has not been received, entering the first low-power state when the transition to the first low-power state is complete. The available low-power states are low-power states that are below a time threshold for transitioning.

In a method according to another embodiment of the present disclosure, a method for managing a memory controller is disclosed. The method comprises selecting for entry a first frequency of the memory controller for, exiting a first state, transitioning to the first frequency from a second frequency, and re-entering the first state when the transition to the first frequency is complete. The first state comprises one of an active state and one of a plurality of low-power states.

In an apparatus according to one embodiment of the present invention, a power management apparatus is disclosed. The power management apparatus comprises a controller module, a state-machine engine, a storage, a context engine, a memory controller, and a memory. The controller module is configured to select a power state for transition. The state-machine engine is configured to execute steps for transitions between power states of the memory controller connected by a bus to the memory. The storage is configured to store at least one context. The context engine is configured to stream, at the direction of the state-machine, the at least one context to the memory controller. The streaming comprises communicating N portions of context data as a stream to N registers in the memory controller. The at least one context comprises a plurality of calibrations corresponding to a state selected for transition.

BRIEF DESCRIPTION OF THE DRAWINGS

The present invention will be better understood from the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Embodiments of the present invention provide a solution to the increasing challenges inherent in utilizing power conservation states with their required entry and exit latencies. Various embodiments of the present disclosure may provide a method for efficiently managing a transition to and/or from an active state and a low-power state, as well as transitioning between several different frequencies. As discussed in detail below, efficient state transitions may be achieved using a centralized sequencing mechanism that is aware of real-time system latency tolerances, can control multiple mechanisms distributed throughout a chip, and is accompanied by local storage of pre-computed and calibrated power-state "contexts" applicable to each power state (low-power states and active states) and frequency combination.

Sequencing Memory Controller Low-Power and Frequency Changes:

In one embodiment, as illustrated in table 1, memory controller (MC) states may abstract the following options for saving power during inactive periods. As illustrated in table 1, an exemplary MC0 state may be an active state in which a computer system can freely access dynamic random-access memory (DRAM) devices. As discussed herein, a memory controller may run at different frequencies depending on performance requirements of the system. A lower frequency operation is often more power efficient. Mechanisms described herein may facilitate fast and safe memory frequency transitions.

A memory controller may also be set into a power-saving state during periods of inactivity. The DRAM is unavailable in non-MC0 states (e.g., an active state), so that the time a memory subsystem can remain in a non-MC0 state is limited. The time it takes to return to the MC0 state may be bounded and within a worst-case latency tolerance of the system. In one exemplary embodiment, a table is developed to determine a worst case latency for each power state, and those power states that exceed the latency thresholds will not be selected. The options and combinations of options with greater power savings may come at an expense of longer exit latencies. The mechanisms described herein minimize latency required to enter into low-power states (e.g., MC1, MC2, MC3, and MC4), and to exit from them to an MC0 state. By minimizing this latency, this scheme maximizes an opportunity for the memory subsystem to be in non-MC0 states (e.g., an increased amount of time may be spent in power saving states).

TABLE 1

| Memory Subsystem State | Description |
| --- | --- |
| MC0 | MC Active |
| MC1 | MC clock-gating and DRAM self-refresh |
| MC2 | MC power-gating and DRAM self-refresh |
| MC3 | MC power-gating; DRAM self-refresh; and MC-PLL shutdown |
| MC4 | Memory Controller power-gating; DRAM self-refresh, MC-PLL shutdown; and MC-I/O power-down |

Figure 1:
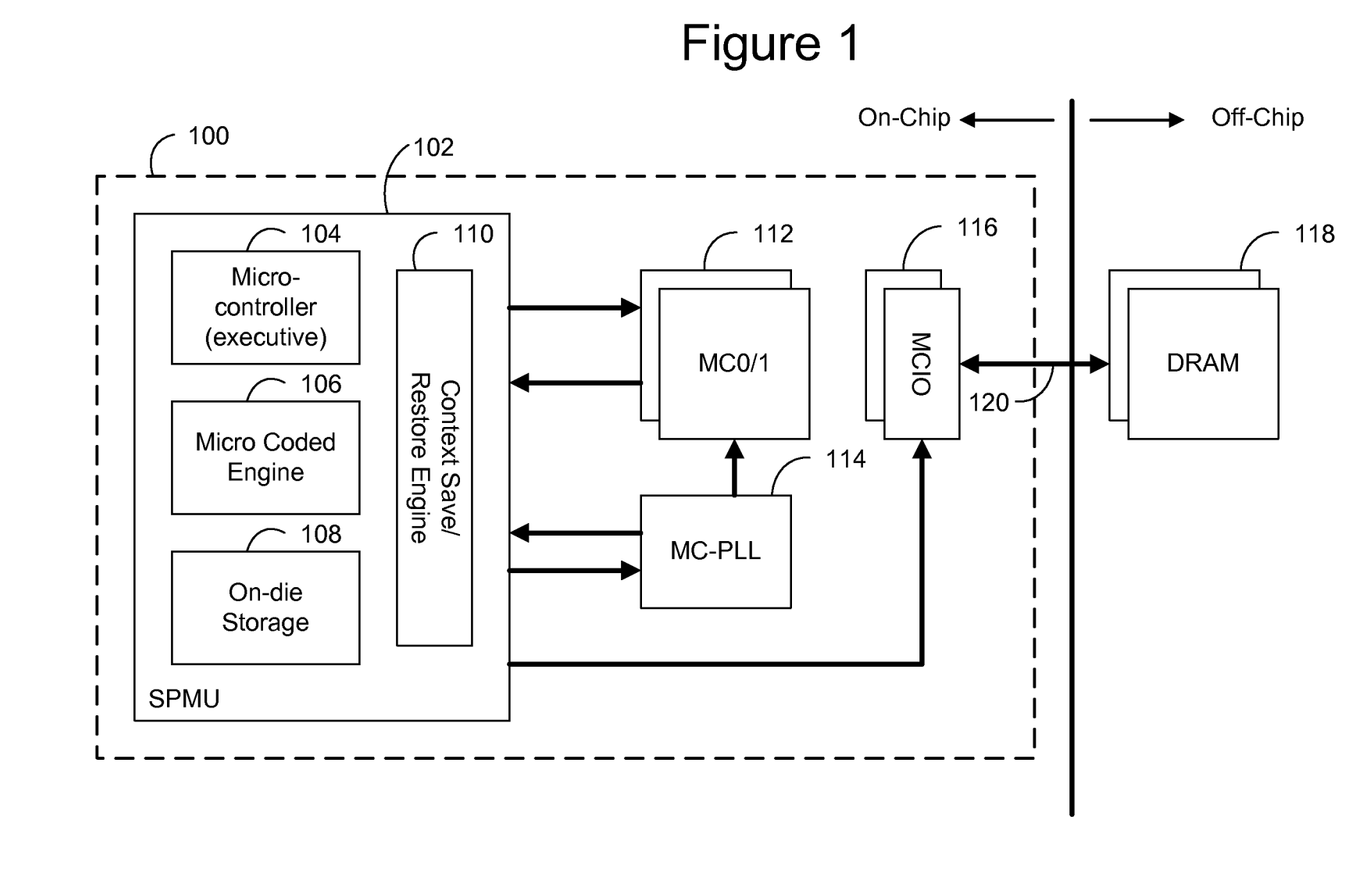
FIG. 1 illustrates an exemplary simplified block diagram of a power management apparatus in accordance with an embodiment of the present invention.

FIG. 1 illustrates an exemplary computer system 100 (e.g., a system on a chip (SOC)) comprising a system power management unit (SPMU) 102, at least one memory controller 112, a memory controller PLL 114, a memory controller input/output 116, and at least one DRAM module 118. As illustrated in FIG. 1, in one embodiment, a system power management unit 102 comprises a micro-controller 104, a micro-coded engine 106, an on-die storage 108 (e.g., an on-die SRAM), and a context save/restore engine 110. In one embodiment, the SOC 100 comprises a plurality of memory controllers 112, a plurality of memory controller input/outputs 116, and a plurality of DRAM modules 118. As further illustrated in FIG. 1, in one embodiment, the DRAM module 118 may be off chip and interconnected with the memory controller input/output 116 by an interface bus 120. In one exemplary embodiment, the bus 120 is a register bus capable of streaming data in read/write operations.

In one exemplary embodiment, the micro-coded engine 106 and the context save/restore engine 110 may run direct memory access (DMA) programmable logic. In one embodiment, the micro-coded engine 106 and the context save/restore engine 110 are configured by firmware at a boot start.

To reduce power-ungating latency and frequency change latency (which may reduce the blank-out period from DRAM modules 118), a memory interface bus 120 may be trained for different frequency values at boot time. For example, the memory interface 120 may be trained for an initial exemplary frequency, MF0, and at the end of training, the context of the memory controller 112 may be saved in the on-die storage 108. Similarly, the memory interface 120 may also be trained for another exemplary frequency, MF1, and the corresponding context also saved to the on-die storage 108. As a result, there may be N sets of contexts for N different frequencies for the memory controller 112. In other words, each power state (e.g., MC0-MCn) will have a corresponding set of contexts for each possible frequency, so that there may be a total of n*N sets of contexts. As discussed herein, when a power management executive, such as the micro-controller 104, decides to change the MC frequency, the context save/restore engine 110 may restore a previously saved context (corresponding to the desired frequency) and switch to the new frequency. Similarly, as discussed herein, when the memory controller 112 has been power-ungated (returning from a low-power state), the context save/restore engine 110 may restore the memory controller context (from the on-die storage 108) which was saved from a previous context prior to power gating, and restores the same clock frequency also.

In one embodiment, a memory controller's 112 current configuration and calibration may be saved as a context when the memory controller 112 is power-gated and then restored from the saved context when the memory controller power is turned back on (e.g., power-ungated). A plurality of contexts may be organized in the on-die storage 108 and saved and/or restored using the context save/restore engine 110. In one embodiment, contexts may be stacked such that the context save/restore engine 110 can point to a start point of the contexts, and knowing a desired new state (e.g., MC0, MC1, etc.), can stream the desired contexts out depending on context saving and restoring. If rebooting, all contexts may be streamed out. As discussed herein, a stacked portion for each frequency change desired can be saved, with the dynamic portions updating during runtime. In one exemplary embodiment, each of the contexts may be stored in the on-die storage 108. In one embodiment, at least one context is stored in the on-die storage 108 and any remaining contexts are stored in the DRAM module 118.

Figure 2:
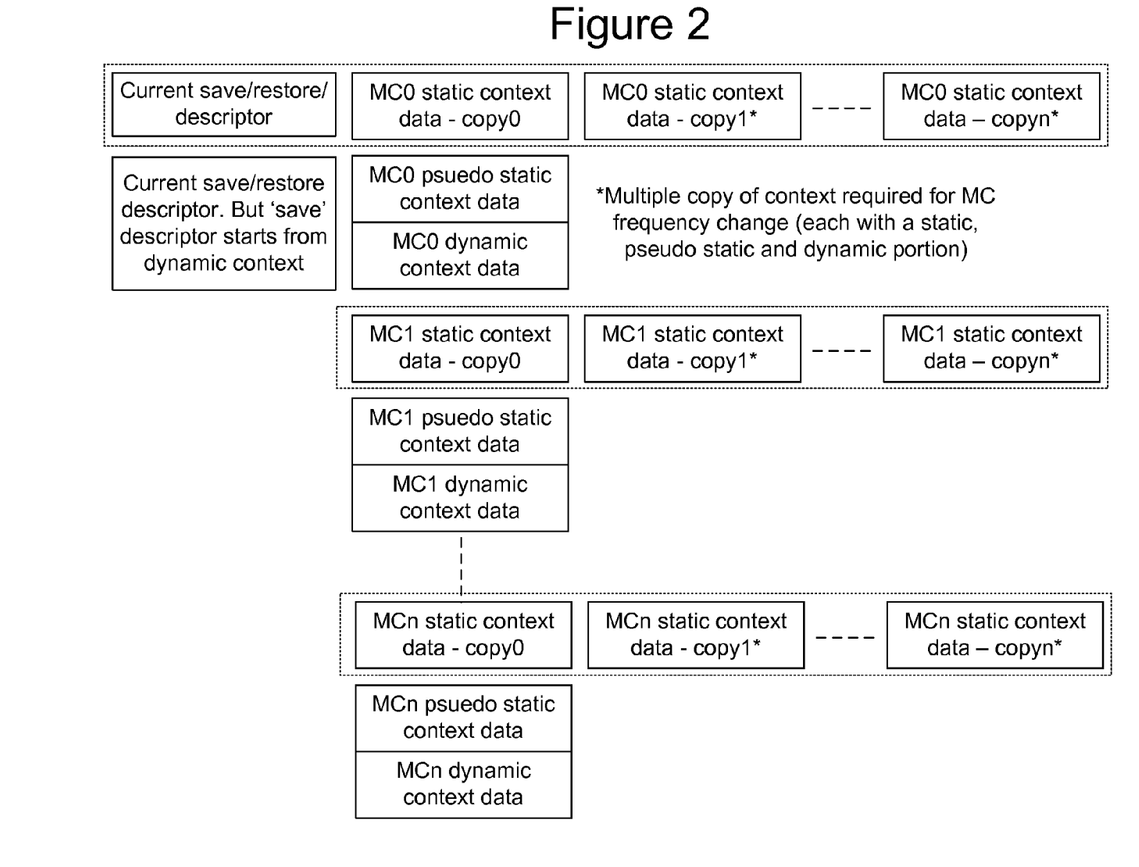
FIG. 2 illustrates an exemplary arrangement of contexts for a plurality of power state and frequency combinations in accordance with an embodiment of the present invention.

In one embodiment, as illustrated in FIG. 2, to reduce memory controller save/restore latencies, a context may be grouped into three groups of context data: static context data that is pre-computed by training, pseudo-static context data that is configured at boot time, and dynamic context that is dynamically generated by the memory controller 112. At boot time, a memory controller I/O 116 and interface bus 120 may be trained for all DRAM frequencies of interest, and all desired states (e.g., MC0-MC4), with the static context stored in the on-die storage 108. In one embodiment, pseudo-static context may comprise performance monitoring counters. While such counters do change, in one embodiment, updated counters may not be needed to survive through a power cycle. In one embodiment, the on-die storage 108 will have sufficient storage capacity for at least one set of context data (e.g., static, pseudo-static, and dynamic) which would be required for restoring the memory-subsystem. In one embodiment, other sets of contexts can be stored in the DRAM 118 and/or in the on-die storage 108.

As illustrated in FIG. 2, a context may be organized such that during a context save operation, only the dynamic content (e.g., context data that changes dynamically by hardware, such as performance monitoring counters) is saved by the context save/restore engine 110. In one exemplary embodiment, context data may be organized into common context (for all memory controllers) and individual (per memory controller) context. During a restore operation, the context save/restore engine 110 restores common context data by stream broadcasting the common context data to all memory controllers 112 and streaming individual context data to each individual memory controller 112.

In one exemplary embodiment, operating systems may have configurations that affect the memory controller. The memory controller has no control over what the operating system wants to change or deposit at run-time for the memory controller, and these changes must be maintained (in dynamic context) during power cycles. For example, the operating system may have the memory controller 112 placed into a particular state that needs to be saved (e.g., error conditions, requests, etc.). These exemplary changes can't be changed until the operating system wants them changed.

Figure 3:
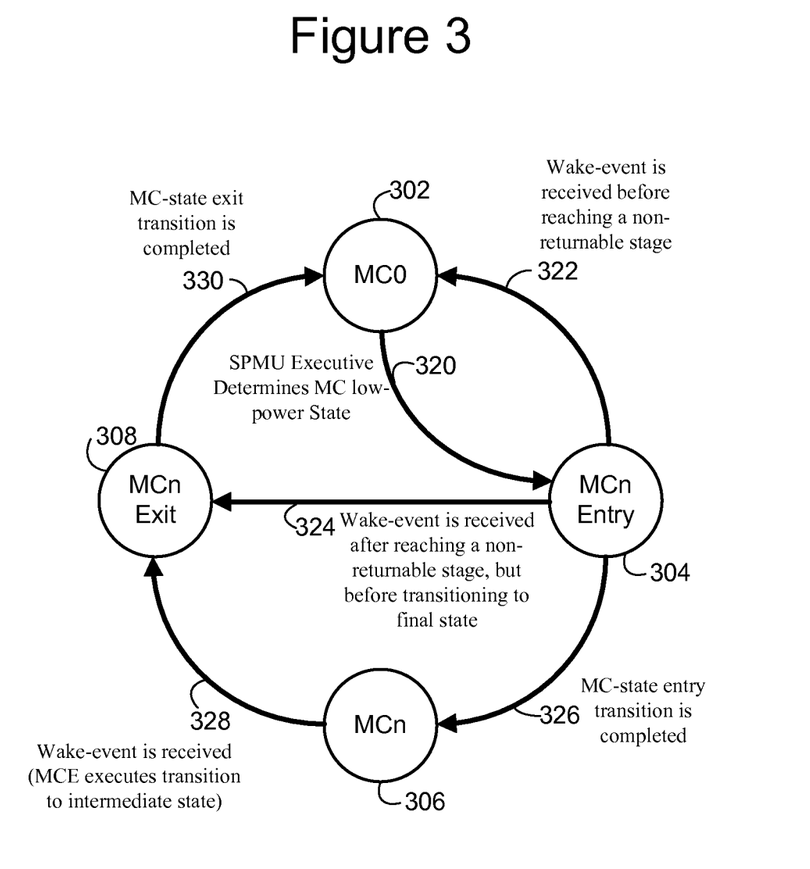
FIG. 3 illustrates an exemplary state diagram for entering and exiting power states of a memory controller in accordance with an embodiment of the present invention.

As illustrated in FIGS. 1 and 3, sequencing between memory controller states may be implemented by a hardware state-machine and the micro-coded engine 106 sequencer located in the system power management unit complex (SPMU) 102. In one embodiment, the exemplary sequencing is not performed by firmware or a kernel software running on a general purpose processor, because of the latency sensitive nature of the state-switching operation. Before the micro-controller 104 enables memory controller states, the micro-controller 104 may perform a few actions to prepare a state for the micro-coded engine 106 and to program all necessary timers and controls.

In one exemplary embodiment, a series of actions may be performed by the micro-controller 104. The micro-controller 104 may negotiate with the system to determine a maximum latency that can be tolerated by all devices. The micro-controller may also select a target low-power MC-state and any corresponding parameters accordingly, as well as state sequence data fields if necessary for this target state. The micro-controller 104 may also ensure that any static state data (e.g., SRAM re-repair or static control registers) are pre-saved in the on-die storage 108. Such steps may ensure that any context-save procedure is short. Such steps also ensure that all required state contexts for the context-restore exist. Once the micro-controller 104 has enabled the MC states, the hardware state machine in the SPMU 102 is able to initiate the micro coded engine 106 to enter a low-power state whenever the memory subsystem is idle and all system clients indicate that they are currently satiated.

In one embodiment, to reduce context save and restore transmission times, a register bus 112 may be used that is capable of streaming "register-writes" or "register-reads" to each of the memory controllers 112, rather than individually addressing each portion of the data. The register bus may also be used to stream broadcast data as register-writes to all of the memory controllers 112 and thereby restore common context data to all of the memory controllers 112. In one exemplary embodiment, the register bus may also stream read-data from the registers for saving the memory controllers' 112 context data. In other words, the context data is read from the registers in a stream for rapid context data saving.

In one exemplary embodiment, the bus receives N different pieces of data and the N pieces of data are stored in the first N registers, e.g., the data is streamed in. A conventional register bus would not be good for streaming data, as a conventional bus would need to dictate what register the data is to be placed into. In other words, an exemplary bus doesn't read from or write to a single register, but reads from and writes to multiple registers.

As discussed herein, in one embodiment the micro-coded engine 106 is a hardware engine that specifically sequences the frequency changes as well as sequences the entering and exiting to and from low-power states (e.g., MC1-MC4). As illustrated in FIG. 3, there are a series of steps that are performed between save and restore steps and are executed by the micro-coded engine 106.

Sequencing Memory Controller Low-Power Changes:

The state diagram of FIG. 3 illustrates an exemplary method for sequencing between the MC-states as implemented by the hardware state-machine in the SPMU 102 and the micro-coded engine 106. In FIG. 3, the arrows indicate that the memory controller 112 decides to go from MC0 to MCn, but will not go there directly. As illustrated in FIG. 3, during an intermediate state the transitions will be performed, and if a wake-event occurs, the transition to the MCn state can be aborted. As discussed in detail herein, non-disruptive steps are performed first (saving context data versus powering down, etc.). In one exemplary embodiment, the early stages of the transitions are transparent to the operating system and are not disruptive. For example, if a wake-event is received by the memory controller 112 when a low-power state transition is in progress, the transition will be aborted, so long as a disruptive step has not yet taken place. In other words, if a non-returnable point has already been reached, when a wake-event occurs, the system would still have to complete the power cycle all the way through from saving context data, to powering down and restoring back to the active state (e.g. MC0) upon repowering. Under such conditions, the system will have to endure both an entry latency and an exit latency.

The exemplary state diagram in FIG. 3 comprises: an MC0 state 302, an MCn Entry state 304, an MCn state 306, and an MCn Exit state 308, where n signifies the selected low-power state for entry (e.g., MC1-MC4). As also illustrated in FIG. 3, the following exemplary state transitions are illustrated: transition 320, transition 322, transition 324, transition 326, transition 328, and transition 330. Transition 320 is initiated when the micro-controller 104 selects an MC low-power state for entry (e.g., MC1-MC4) and the state machine transitions to the MCn Entry state 304. Transition 322 is initiated when a wake-event is received before the memory controller 112 has reached a non-returnable stage in the current transition to a selected low-power state. As illustrated in FIG. 3, the state machine will transition back to the MC0 state 302 with only minimal exit latency, depending on the extent of the entry progress before the wake-event was received.

As illustrated in FIG. 3, in transition 324, a wake-event has been received after the memory controller 112 has reached a non-returnable stage in the current transition to the selected low-power state. Therefore, in transition 324, the memory controller 112 will complete the entry into the selected low-power state and then immediately transition to the MCn Exit state 308 for exiting from the current MCn low-power state and a return to the MC0 or active state 302. As discussed herein, when the wake-event asserts during the MCn Entry state 304, the sequence will jump to the appropriate point in the exit sequence and reverse the process, or else the exit sequence will quickly fall through any unnecessary exit steps, depending on the extent of the transition to the low-power state.

In transition 326, the MC-state entry transition has been completed and the state machine moves to the MCn state 306. In the MCn state 306, the memory controller 112 is operating in the selected low-power state (e.g., MC1-MC4). In transition 328, a wake-event has been received and the micro-coded engine 106 executes a transition to an intermediate state, MCn Exit 308. In transition 330, the MC-state exit at MCn Exit state 308 has completed, and the state machine returns to MC0 state 302.

In one exemplary embodiment, the sequence to return from MCn state 306 to the MC0 state 302 may be initiated whenever a hardware "wake-event" signal asserts. In one embodiment, the wake-event signal will be asserted whenever any of the following occur: a system client has indicated that it requires access to the DRAM module 118, a CPU wake arrives from a timer source (e.g., either an interrupt or an advance-notice), and when the micro-controller 104, for any reason, decides to disable the MC-states (MC1-MC4, as illustrated in Table 1).

Figure 4:
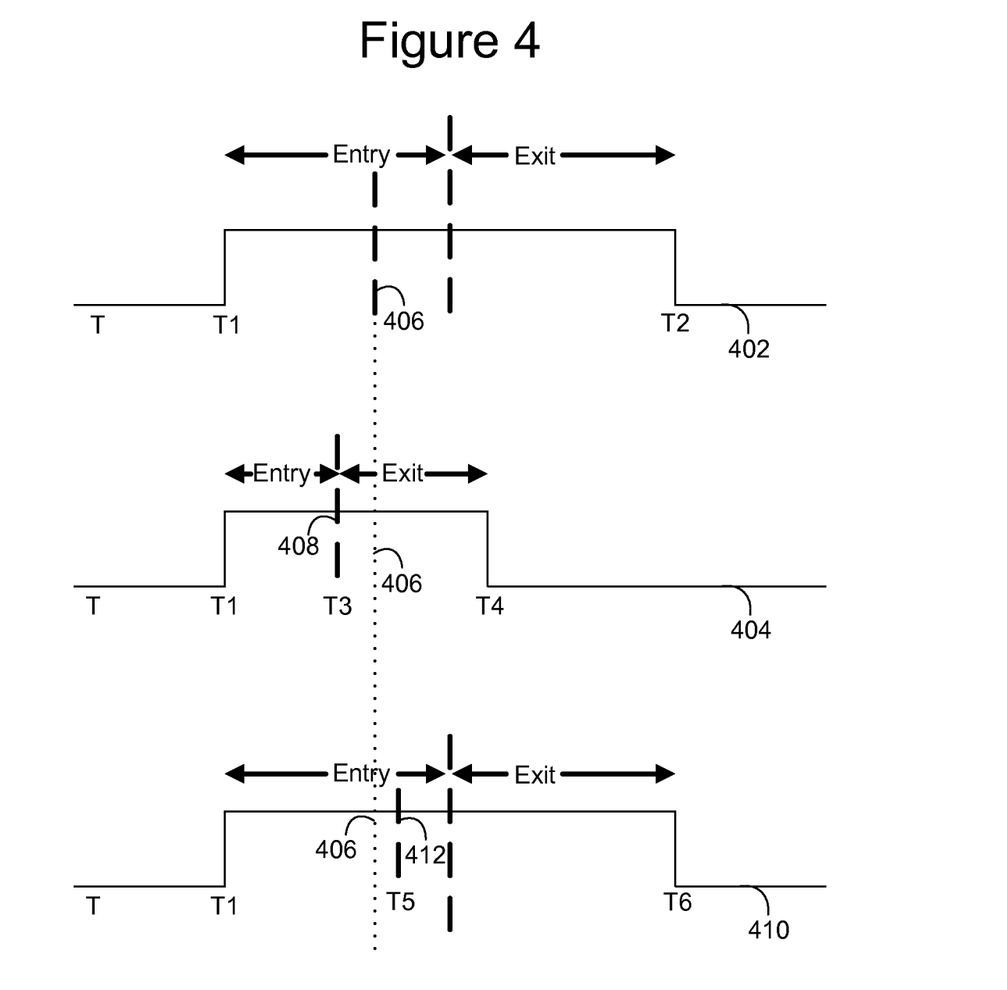
FIG. 4 illustrates an exemplary timing diagram illustrating timing thresholds for particular power state transitions in accordance with an embodiment of the present invention.

In one embodiment, if a wake-event asserts during an entry sequence, the sequence will jump to an appropriate point in an exit sequence and reverse the current process, or else the exit sequence may quickly fall through any unnecessary exit steps. As illustrated in FIG. 4, such steps may avoid adding any unnecessary entry latency time to the exit latency. Timing diagram 402 of FIG. 4 illustrates an exemplary worst-case scenario, where a maximum amount of entry latency into and a maximum amount of exit latency from a low-power state transition is required. In other words, timing diagram 404 illustrates the maximum amount of time required for entry into a low-power state (entry latency), and the maximum amount of time required for exit from the current low-power state (exit latency), resulting in a worst-case latency of T1 to T2. As discussed herein, such a worst-case scenario should not normally happen, as a wake-event received at the beginning of the entry should result in an abort of the entry transition and a rapid exit transition.

Figure 5:
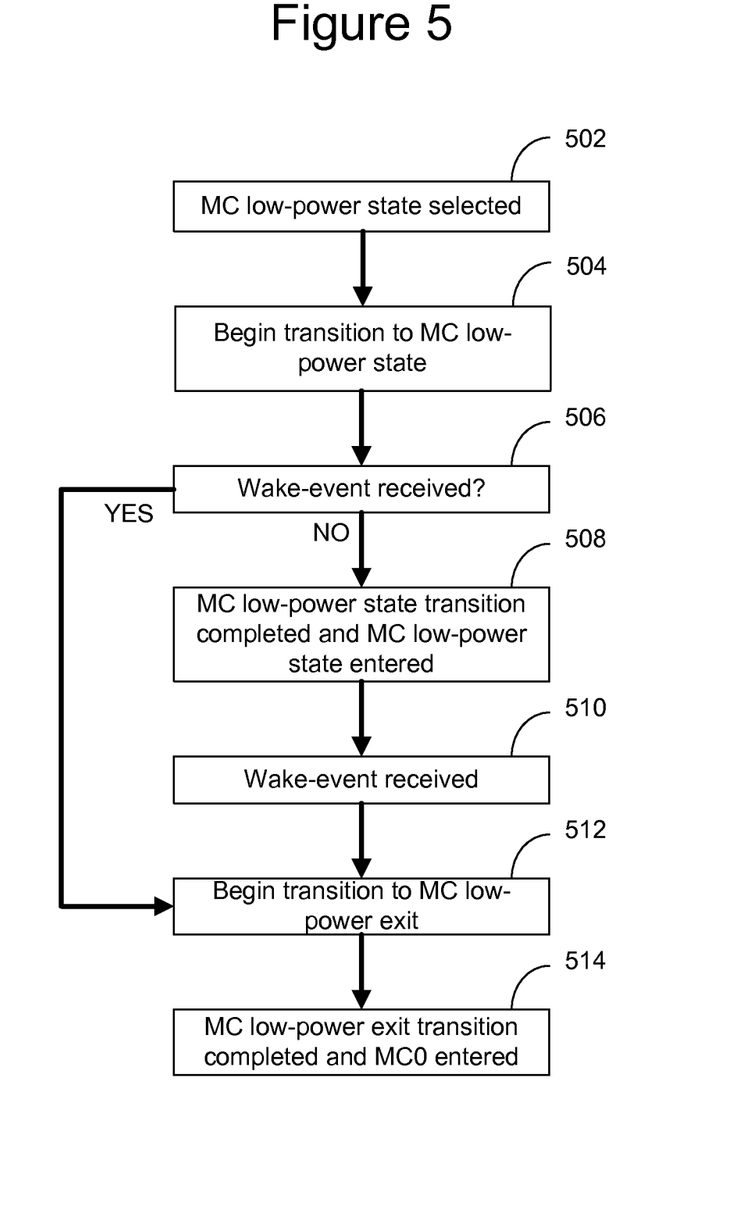
FIG. 5 illustrates an exemplary flow diagram, illustrating steps to a method in accordance with an embodiment of the present invention.

Timing diagram 404 of FIG. 4 illustrates an exemplary scenario with reduced entry latency and a reduced amount of exit latency (T3 to T4). As illustrated in timing diagram 404 of FIG. 4, line 406 intersects timing diagram 404 and represents a non-returnable stage or threshold. Line 408 intersecting timing diagram 404 represents a point in the current entry transition when a wake-event is received. As line 408 is before line 406, in timing diagram 404, the remainder of the entry sequence can be aborted and the exit transition to an active state (MC0 state) immediately started. As illustrated in timing diagram 404 of FIG. 4, the exit latency required may be less than the worse case exit latency illustrated in FIG. 4, depending on the extent of the entry sequences that were completed and must now be reversed to return to an active state. As also illustrated in FIG. 5, when the wake-event occurs before reaching a non-returnable stage, the remainder of the entry sequence may be aborted and the resulting exit latency reduced in accordance with the exit sequences that need not be performed. In other words, T3-T4 is an exemplary latency that must be endured upon receipt of a wake-event at T3 before the memory controller 118 returns to an active state and the DRAM module 118 is accessible. In one embodiment, T3-T4 is only exit latency, because the entry was aborted.

In one exemplary embodiment, when a portion of a plurality of steps for a transition is completed, the exit latency may include dealing with those steps that were performed (e.g., adjusting or changing them as required for an active state). Some steps take longer to recover from than others. For example, when a PLL is turned off, it will take some time to spin back up again. In one exemplary embodiment, there may be a plurality of wake-events and a plurality of decision events, with the most critical event being a power-gating, where contexts of registers are lost and is the most critical non-recoverable event. In another embodiment, other types of events may also be unrecoverable, such as powering down the MCIO 116.

Timing diagram 410 of FIG. 4 illustrates an exemplary scenario with portions of entry latency and exit latency that must be endured upon receipt of a wake-event at T5 before the memory controller 118 returns to an active state and the DRAM module 118 is accessible. As illustrated in FIG. 4, line 406 also intersects timing diagram 410 and represents the non-returnable stage or threshold. Line 412 intersecting timing diagram 410 represents a point in the current entry transition (e.g., time T5) when a wake-event is received. As time T5, line 412, is beyond the threshold point, line 406, a portion of entry latency and exit latency must be endured (T5 to T6).

Table 2 illustrates an exemplary sequence of steps for changing a memory subsystem state MC0 (e.g., an active state) to MCn (e.g., one of the low-power states, MC1-MC4). In one exemplary embodiment, the first step of table 2 is performed by the SPMU 102, while the remaining steps may be performed by the micro-coded engine 106. In one exemplary embodiment, shutting down the memory controller PLLs and/or DLLs in step 9 may be considered a non-returnable event and would bring any current entry transition beyond a non-returnable stage or threshold level. In one exemplary embodiment, a single memory controller 112 is entered into a low-power state. In one embodiment a plurality of memory controllers 112 are entered into a low-power state.

TABLE 2

| Step 1: | If (sleep_event) Call MCn Entry MCE sequence. |
| --- | --- |
| Step 2: | Block all request sources, and acquire all necessary resources. |
| Step 3: | Wait a short period of time for block signals to propagate. |
| Step 4: | Tell MC to enter self-refresh state once all remaining requests are processed. |
| Step 5: | Wait for MC to confirm that it has entered self-refresh state. |
| Step 6: | Engage MEMIO rail power-down. |
| Step 7: | Save MC state context. |
| Step 8: | Switch MC clock to bypass clock source. |
| Step 9: | Shutdown the MC PLL/DLL. |
| Step 10: | Clamp signals in preparation for power gating. |
| Step 11: | Assert reset to all MC. |
| Step 12: | Clamp MC clocks. |
| Step 13: | Initiate power-gating for MC. |
| Step 14: | Release any resources acquired for this sequence. |

Table 3 illustrates an exemplary sequence of steps for changing a memory subsystem state MCn (e.g., a low-power state MC2-MC4) to MC0, an active state. In one exemplary embodiment, the first step of table 3 is performed by the SPMU 102, while the remaining steps may be performed by the micro-coded engine 106. In one exemplary embodiment, a single memory controller 112 is returned from a low-power state to an active state. In another embodiment a plurality of memory controllers 112 are returned from a low-power state to an active state.

TABLE 3

| Step 1: | If (wake_event) Call MCx Exit MCE sequence. |
| --- | --- |
| Step 2: | Acquire all necessary resources for exit sequence that might otherwise stall or slow the entry sequence. |

TABLE 3-continued

| Step 3: | Step one (of two) of MEMIO rail power-up sequence. |
| --- | --- |
| Step 4: | Start timer to count out time for VDD_MEM rail to stabilize. |
| Step 5: | To optimize power, delay start of next step as long as possible so that MEMIO rail is powered just before we are ready to take memory out of self-refresh. |
| Step 6: | Start relocking the MC PLL/DLL and other PLLs, which are required for devices to access DRAM. |
| Step 7: | Initiate power-ungating for MCx. |
| Step 8: | Wait for power-ungating to complete. |
| Step 9: | Unclamp MC clock and wait for reset to propagate. |
| Step 10: | De-assert reset to all MCx. |
| Step 11: | De-assert clamp-enable to all MC. |
| Step 12: | Enable clock crossings. |
| Step 13: | Do SRAM Re-repair. |
| Step 14: | Restore context. |
| Step 15: | Wait MC PLL/DLL is locked. |
| Step 16: | Tell MC-Clocks block to switch to VCO. |
| Step 17: | Wait for MEMIO rail power-up timer to expire. |
| Step 18: | Unblock requests. |
| Step 19: | Tell MC0 and MC1 to exit self-refresh state. |
| Step 20: | Release any resources acquired for this sequence. |

Sequencing Memory Controller Frequency Changes:

As discussed herein, in addition to selecting from among a plurality of low-power states, during periods of inactivity, a frequency lower than a current frequency may be selected. In one exemplary embodiment, the micro-controller 104 may determine that a frequency change is appropriate (for example, to a lower frequency) and will make any voltage changes necessary in preparation for a frequency change. As discussed herein, the sequencing of memory controller frequency changes may be implemented by a hardware state-machine and the micro-coded engine 106 of the SPMU 102. Similarly to the sequencing of state changes, the sequencing of frequency changes may be performed by hardware, rather than firmware, because of the latency sensitive nature of the operation (frequency changes).

In one exemplary embodiment, with the use of the micro-coded engine 106, a memory frequency (MF) state machine, similar to an MC-state change state-machine, as illustrated in FIG. 3, may be used to change memory frequencies. In one embodiment, a memory controller context (corresponding to the destination memory frequency) is restored by the context save/restore engine 110 during a sequence of steps for changing from an original frequency to a new destination frequency. In one embodiment, table 4 illustrates an exemplary sequence of steps for changing a memory subsystem frequency from MF0 to MF1 (where MF1>MF0 frequency). In one embodiment, a single memory subsystem frequency is changed. In one embodiment, a plurality of memory subsystem frequencies is changed.

TABLE 4

| Step 1: | Program voltage accordingly. |
| --- | --- |
| Step 2: | Disable MC-state transitions. |
| Step 3: | Tell all system memory clients to top-off their buffers. |
| Step 4: | Call MC Frequency-Change MCE sequence. |
| Step 5: | Wait for clients to indicate they are ready for MC long latency. |
| Step 6: | Tell MC to enter self-refresh state. |
| Step 7: | Wait for MC to indicate it has entered self-refresh state. |
| Step 8: | Disable the clock crossing. |
| Step 9: | Switch to bypass clock. |
| Step 10: | Enable the clock crossing. |
| Step 11: | Halt and reprogram PLL/DLL, initiate relock. |
| Step 12: | Load new MCx register settings over MC register bus. |
| Step 13: | Load new dram MRS settings into MC registers over register bus. |
| Step 14: | Disable the clock crossing. |
| Step 15: | Wait for MC PLL/DLL to be locked. |
| Step 16: | Tell MC-Clocks block to switch to PLL. |

TABLE 4-continued

Step 17: Enable the clock crossing.
Step 18: Tell MC to exit self-refresh state.
Step 19: Re-enable MC-state transitions if appropriate.

In one exemplary embodiment, frequency transitions may be completed without prohibitive latency when a wake-event occurs during the frequency transition. In one exemplary embodiment, the latency required to shift to a faster frequency is below a threshold such that a lower frequency may be used during periods of reduced demand and then changed to a faster frequency during periods of increased demand. In other words, the latency required to shift from a first frequency to a second frequency is low enough that an amount of time required to change frequencies may be tolerated by subsystems waiting for DRAM module 118 access. In one embodiment, steps 1-4 may be performed by SPMU firmware, while remaining steps 5-19 may be performed by the micro coded engine 106.

In one exemplary embodiment, a memory can be run at a first selected frequency or a second selected frequency. The first selected frequency would have parameters saved in its corresponding context that are specific to the first selected frequency, while the second selected frequency would have other parameters saved in its corresponding context that are specific to the second selected frequency. In a further embodiment, a plurality of different frequencies may be available. As discussed herein, while parameters will be saved in the corresponding static contexts, while running the memory controller at a certain frequency, any periodic recalibrations or statistics that are saved will be saved with the dynamic portion of the corresponding context, so that the statistical and recalibration results may be used during a next restore.

In one exemplary embodiment, a frequency change may be more dynamic than low-power state transitions. In low-power state transitions, the system must be powered down, but in frequency changes, the system need not be in a deep idle state. In one exemplary embodiment, a frequency change may be implemented in 10's of microseconds. The latency incurred from frequency transitions still results in a black-out period for the memory controller 112 and the DRAM module 118. However, as described herein, the latency suffered from a frequency transition can be endured up to a determined threshold.

In one exemplary embodiment, as described herein, if the frequency transition latency is short enough, the system may start with a lower frequency and then quickly ramp up to a higher frequency as needed. With short frequency transition latency and a plurality of possible frequency selections, a fine granularity in frequency selection is possible. In one embodiment, a table is developed to determine a worst case latency for each frequency transition, and those frequency transitions that exceed the latency thresholds will not be selected.

In another exemplary embodiment, a frequency transition may be combined with an MCn state change. In one embodiment, a table may be developed to determine a worst case latency for each power state and those power states that exceed the latency thresholds will not be selected. In one exemplary embodiment, a table may be developed to determine a worst case latency for each power state and for each frequency transition and those states and frequency transitions that exceed the latency thresholds will not be selected.

FIG. 5 illustrates steps to an exemplary method for transitioning between power states of a memory controller. In step 502 of FIG. 5, a memory controller low-power state (e.g., MC1-MC4) is selected. As discussed herein, one of a plurality of low-power states may be selected. As also illustrated in table 1, each low-power state may bring the memory controller 112 into a deeper power conservation state. In step 504 of FIG. 5, the transition to the memory controller low-power state is begun. In step 506 of FIG. 5, if a wake-event has been received, the method continues to step 512 of FIG. 5. If a wake-event has not been received, the method continues to step 508 of FIG. 5 and the transition to the selected low-power state continues until it is finished. In one exemplary embodiment, the monitoring of wake-events in step 506 may be continuous during the transition to the selected low-power state.

As illustrated in FIG. 5, in step 508, after completion of the transition phase, the memory controller 112 is now in the selected low-power state. As discussed herein, during any low-power state, the memory controller 112 is unable to communicate with the memory (e.g., DRAM memory).

In step 510 of FIG. 5, a wake-event is received. In one exemplary embodiment, the wake-event may be received by the system power management unit 102. As discussed herein, the wake-event may comprise communication requests to the DRAM memory module 118, as well as other components requesting access to the DRAM memory module 118.

In step 512 of FIG. 5, a transition to an exit from the current low-power state is begun. As described herein, such an exit will return the memory controller 112 to an active state and restore communication between the memory controller 112 and the DRAM memory module 118. In step 514 of FIG. 5, the transition from the low-power state is completed and an active state (e.g., MC0) for the memory controller 112 is restored.

Figure 6:
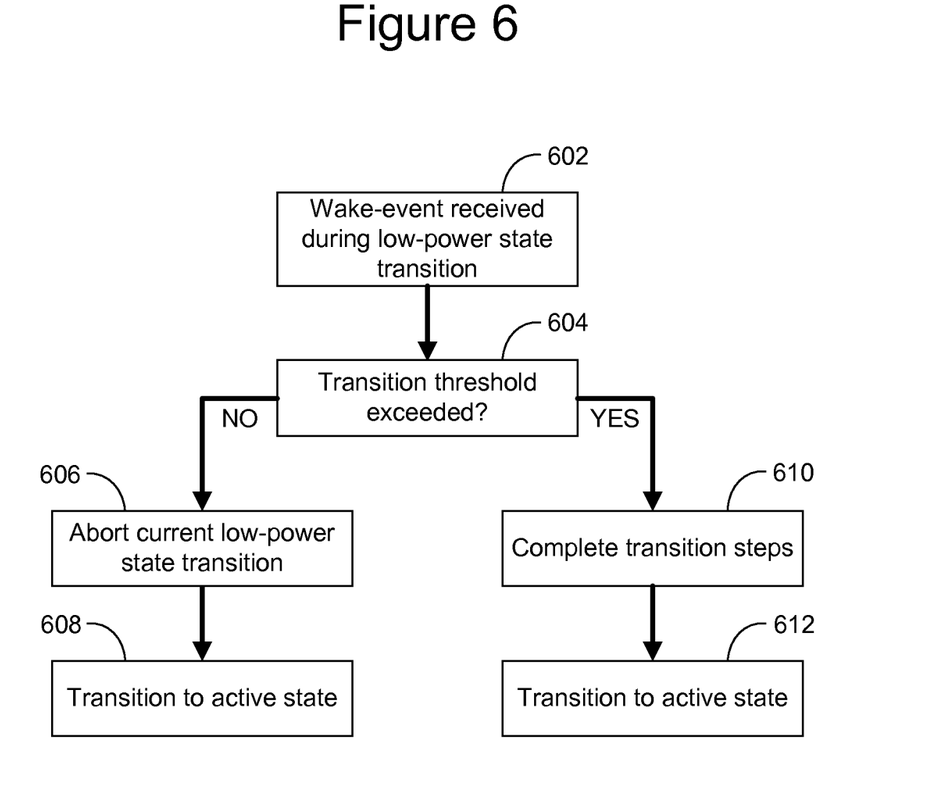
FIG. 6 illustrates an exemplary flow diagram, illustrating steps to a method in accordance with an embodiment of the present invention.

FIG. 6 illustrates steps to an exemplary method for transitioning between power states of a memory controller 112 when the system power management unit 102 is currently transitioning from a previous state to a low-power state when a wake-event has been received. In step 602 of FIG. 6, a wake-event has been received while a transition to a low-power state is still on-going.

In step 604 of FIG. 6, an extent of the current transition to the low-power state is determined. If the extent of the current transition is below a threshold, the method continues to step 606 and the current transition is aborted and exited from for transition to an active state. If the extent of the current transition is above the threshold, the method continues to step 610 and the transition to the low-power state is completed to power down.

When the extent of the current transition is below the threshold, as determined in step 604, the method continues to step 606. In step 606 of FIG. 6, the current transition (to a low-power state) is aborted (e.g., not continued further). In one exemplary embodiment, as discussed herein, aborting the transition ceases the steps of the current low-power transition. After exiting from the current low-power state transition, the method continues to step 608. In step 608 of FIG. 6, a transition is begun to an active state. In one embodiment, when transitioning to the active state, the transition includes resetting all parameters and hardware settings that were changed, powered down, etc., during the transition to the low-power state. In other words, the further along in the transition to the low-power state that was accomplished, the longer it will take to complete the transition to the active state.

When the extent of the current transition is above the threshold, as determined in step 604, the method continues to step 610. In step 610 of FIG. 6, the current transition (to a low-power state) is completed. Once the low-power transition is complete, the method continues to step 612. In step 612 of FIG. 6, the method transitions the memory controller 112 from the current low-power state settings to an active state.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for managing a memory controller, the method comprising:
   selecting for entry a first low-power state from a plurality of available low-power states, wherein an available low-power state is a low-power state that is below a time threshold for transitioning;
   transitioning to the first low-power state from an original state;
   provided a wake event has not been received, entering the first low-power state when the transition to the first low-power state is complete.

2. The method of claim 1, wherein for each of the plurality of low-power states an interconnection between a memory and the memory controller is shut off, making the memory unavailable.

3. The method of claim 1 further comprising:
   receiving a wake-event after the entering the first low-power state;
   beginning a transition to an active state from the first low-power state; and
   entering the active state provided the transition from the first low-power state to the active state is complete.

4. The method of claim 1 further comprising:
   beginning a transition to an active state when a wake-event has been received during the transition to the first low-power state, wherein the beginning the transition to the active state aborts the transition to the first low-power state provided the transition to the first low-power state is below a threshold, otherwise, completely transitioning to the first low-power state before the beginning the transition to the active state; and
   entering the active state when the transition to the active state is complete.

5. The method of claim 1, wherein transitioning to a new state comprises:
   selecting a context from a plurality of contexts, wherein the selected context corresponds to the new state, wherein each context of the plurality of contexts corresponds to a state of the plurality of states, wherein the new state is selected from the plurality of states, wherein each context defines parameters for the corresponding state of the plurality of states, and wherein a new state comprises one of a low-power state and an active state; and
   streaming the selected context into a memory controller for setting the memory controller for the corresponding new state, wherein streaming comprises communicating N portions of context data as a stream to N registers in the memory controller.

6. The method of claim 5, wherein a context comprises at least one of a static portion, a pseudo-static portion and a dynamic portion.

7. The method of claim 6, wherein transitioning to a new state further comprises streaming a dynamic portion of a context for a current state from a memory controller to a memory for storage before beginning the transition to the new state, and wherein streaming comprises communicating N portions of dynamic context data as a stream to the memory from N registers in the memory controller.

8. The method of claim 1, wherein a context comprises contextual information for one of a corresponding active state and low-power state and a corresponding frequency from a plurality of frequencies, wherein a context is stored in memory for each state and frequency combination.

9. A method for managing a memory controller comprising:
   selecting for entry a first frequency of the memory controller from a plurality of available frequencies, wherein an available frequency is a frequency having a period that is below a time threshold for transitioning;
   exiting a first state, wherein the first state comprises one of an active state and one of a plurality of low-power states;
   transitioning to the first frequency from a second frequency; and
   re-entering the first state when the transition to the first frequency is complete.

10. The method of claim 9 further comprising:
    selecting a first state for entry, the first state comprising one of an active state and one of a plurality of low-power states;
    transitioning to the first state from a second state; and
    provided a wake event has not been received when the first state is other than an active state, entering the first state when the transition to the first state and the transition to the first frequency are complete, wherein for each of the plurality of low-power states an interconnection between a memory and the memory controller is shut off, making the memory unavailable.

11. The method of claim 9, wherein a transition to a first frequency comprises:
    selecting a context from a plurality of contexts, wherein the selected context corresponds to the first frequency, wherein each context of the plurality of contexts corresponds to a frequency of a plurality of frequencies, wherein the first frequency is selected from the plurality of frequencies, wherein each context defines parameters for a corresponding frequency of the plurality of frequencies; and
    streaming the selected context into a memory controller for setting the memory controller for the corresponding different frequency, wherein streaming comprises communicating N portions of context data as a stream to N registers in the memory controller.

12. The method of claim 11, wherein a context comprises at least one of a static portion, a pseudo-static portion and a dynamic portion.

13. The method of claim 12, wherein a transition to a first frequency further comprises streaming a dynamic portion of a context for a current frequency from a memory controller to a memory for storage before beginning the transition to the first frequency, and wherein streaming comprises communicating N portions of dynamic context data as a stream to a memory from N registers in the memory controller.

14. A power management apparatus comprising:
    a controller module configured to select a power state for transition;
    a state-machine engine configured to execute steps for transitions between power states of a memory controller connected by a bus to a memory;
    a storage configured to store at least one context; and
    a context engine configured to stream, at the direction of the state-machine engine, the at least one context to the memory controller, wherein streaming comprises communicating N portions of context data as a stream to N registers in the memory controller, and wherein the at least one context comprises a plurality of calibrations corresponding to a state selected for transition.

15. The power management apparatus of claim 14, wherein the power states comprise an active state and at least one low-power state, and wherein for each of the at least one low-power states the bus between the memory and the memory controller is shut off, making the memory unavailable.

16. The power management apparatus of claim 14, wherein each context comprises at least one of a static portion, a pseudo-static portion, and a dynamic portion.

17. The power management apparatus of claim 14, wherein each context corresponds to a frequency.

18. The power management apparatus of claim 14, wherein the state-machine engine and the controller module are further configured to transition the memory controller from an original state to a selected low-power state, and wherein the state-machine engine and the controller module are further configured to abort the transition to the selected low-power state when a wake-event is received.

19. The power management apparatus of claim 14, wherein the state-machine engine is further configured to transition the memory controller from a low-power state to an active state when a wake-event occurs.

20. The power management apparatus of claim 14, wherein the state-machine engine and the controller module are further configured to abort a current transition to a low-power state and begin a transition to an active state when a wake-event occurs, provided the current transition to the low-power state is below a threshold, otherwise, the current transition to the low-power state will be completed before beginning the transition to the active state.

21. The power management apparatus of claim 14, wherein each context corresponds to a particular state and frequency combination, and wherein each context defines parameters for each particular state and frequency combination.

22. The power management apparatus of claim 14, wherein the context engine is further operable to stream a dynamic portion of a context for a current state from the memory controller to the storage before the state-machine engine begins the transition to a new state, and wherein streaming comprises communicating N portions of dynamic context data as a stream to the memory from N registers in the memory module.

* * * * *